United States Patent [19]

Muramatsu

[11] 4,215,416
[45] Jul. 29, 1980

[54] INTEGRATED MULTIPLIER-ACCUMULATOR CIRCUIT WITH PRELOADABLE ACCUMULATOR REGISTER

[75] Inventor: John J. Muramatsu, Hermosa Beach, Calif.

[73] Assignee: TRW Inc., Redondo Beach, Calif.

[21] Appl. No.: 888,980

[22] Filed: Mar. 22, 1978

[51] Int. Cl.² .............................................. G06F 7/48
[52] U.S. Cl. ..................................... 364/736; 364/768
[58] Field of Search ................ 364/736, 728, 754, 768

[56] References Cited

U.S. PATENT DOCUMENTS

| | | | |
|---|---|---|---|
| 3,840,861 | 10/1974 | Amdahl et al. | 364/200 |
| 4,063,082 | 12/1977 | Nussbaumer | 364/728 |

Primary Examiner—David H. Malzahn
Attorney, Agent, or Firm—Fulwider, Patton, Rieber, Lee & Utecht

[57] ABSTRACT

An integrated circuit having a preloadable accumulator register for accumulating the arithmetic sum of a succession of multiplier products therein. The circuit includes preload control logic for selecting data for storage in the accumulator register either from input terminals, from a summing circuit which receives current product data and accumulated product data, or from the accumulator register itself. Depending upon the conditions of a preload control signal and field selection signals, the preload control logic can either preload selected fields of the register with input data, leaving unselected fields intact, or can store current or accumulated product data in the register.

9 Claims, 4 Drawing Figures

INTEGRATED MULTIPLIER-ACCUMULATOR CIRCUIT WITH PRELOADABLE ACCUMULATOR REGISTER

BACKGROUND OF THE INVENTION

This invention relates generally to integrated circuits for performing digital multiplication, and, more particularly, to multiplier circuits that are also capable of performing product accumulation. Integrated or monolithic circuits for performing digital multiplication are, of course, well known. Briefly, and by way of background, such multipliers operate on a digital, and usually binary, multiplier quantity, and a corresponding digital multiplicand quantity, to generate a binary product. Typically, the multiplier and multiplicand have equal numbers of binary digits. If the full significance of the quantities multiplied together is to be retained, the product will contain twice as many binary digits (bits) as either the multiplier or the multiplicand. Such digital multipliers may usually be operated in one of two modes; an integer mode, in which the quantities being multipled are treated as positive integers, and a two's complement mode, in which the multiplier, multiplicand, and product are each represented as signed, i.e. positive or negative, binary fractions.

In some applications of multipliers, it is necessary to accumulate or add together a sequence of products derived from a succession of pairs of numerical quantities. Although this accumulation function may be performed by logic external to the multiplier circuit, it is clearly more efficient to provide an accumulation function in the same integrated circuit as the multiplier. One example of a multiplier-accumulator for multiplying pairs of twelve-bit quantities and accumulating the resulting products, is the Model TDC1003J, manufactured by TRW LSI Products, Redondo Beach, Calif. 90278. When the accumulation function is rendered operable in this circuit, each product quantity is added to the contents of an accumulator register, or, at the user's option, the contents of the accumulator register are subtracted from the product and stored back in the accumulator register.

Although multiplier-accumulators of this general type are perfectly satisfactory for many applications, there are some computations in which it is desirable to be able to preload the accumulator register with a selected value, and then to begin further accumulation of products in the register. The value to be preloaded into the accumulator register might, for example, represent an interim accumulation of products which was temporarily stored externally, while the multiplier-accumulator was being used for other computations. Again, logic for performing the equivalent of such a preloading function could be provided externally to the multiplier-accumulator circuit. For example, an initial quantity P could be stored in the accumulator register by multiplying P by 1.0 and conditioning the circuit for pure multiplication, i.e. no accumulator function. However, such external logic is inherently inefficient because of the additional time delay that it introduces in performing the required arithmetic functions.

It will be appreciated from the foregoing that there is a significant need for an integrated circuit which will perform the aforedescribed functions, and will thereby effect a considerable reduction in complexity and computation time in contrast to comparable techniques utilizing external logic. Ideally, any circuit for presetting the contents of the accumulator register in a multiplier-accumulator should be operable to preset only selected fields of the register, and to leave the unselected fields intact. The present invention is directed to these ends.

SUMMARY OF THE INVENTION

The present invention resides in an integrated multiplier-accumulator circuit having an accumulator register which may be selectively preloaded in accordance with input signals applied to a set of input terminals. Basically, and in general terms, the improvement of the invention includes preload control means for use in a multiplier-accumulator circuit which comprises a multiplier circuit, a summing circuit coupled to the multiplier circuit, an accumulator register coupled to receive data from the summing circuit, and accumulator control logic for selectively transmitting data from the accumulator register back to the summing circuit.

In accordance with an important aspect of the invention, the preload control means operates in response to control signals to transfer data to the accumulator register from one of three separate sources: from the summing circuit, from the input terminals that supply data for preloading to the accumulator register, or from the accumulator register itself. Operation of the preload control means is controlled by a preload control signal, which determines whether or not data is to be derived from the summing circuit, and by field selection control signals, which, in preloading, designate the fields of the accumulator register that are to be preloaded with input data. Fields not selected for preloading will be maintained in their previous conditions by recirculating data from the accumulator register back through the preload control means, and thence to the accumulator register again.

In the presently preferred embodiment of the invention, the input terminals share the same terminal pins as corresponding output terminals of the accumulator register. To accomodate these dual functions, the circuit of the invention also includes three-state buffer means connected between the accumulator register and the input/output terminals, the buffer means being controlled by signals from the preload control means. One state of the buffer means is a high-impedence state, which effectively disconnects the accumulator register from the input/output terminals, so that the terminals may then be used to supply input data to the preload control means. When not in the high-impedence state, the buffer means function to transmit output data from the accumulator register to the terminals. In accordance with another important aspect of the invention, the buffer means may be placed in the high-impedance state either by the preload control signal or by the field selection signal. The field selection signal, therefore, serves one of two purposes: to select fields to be preloaded or to select fields to be isolated from the input/output terminals when not preloading.

It will be apparent from the foregoing that the present invention represents a significant advance in the field of integrated multiplier-accumulator circuits. In particular, the invention provides hitherto unavailable integrated circuitry for preloading the accumulator register, or selected fields thereof, with input data provided at any desired stage in a sequence of multiplication and accumulation operations. Other aspects and advantages of the present invention will become appar-

DESCRIPTION OF THE PREFERRED EMBODIMENT

Figure 1:
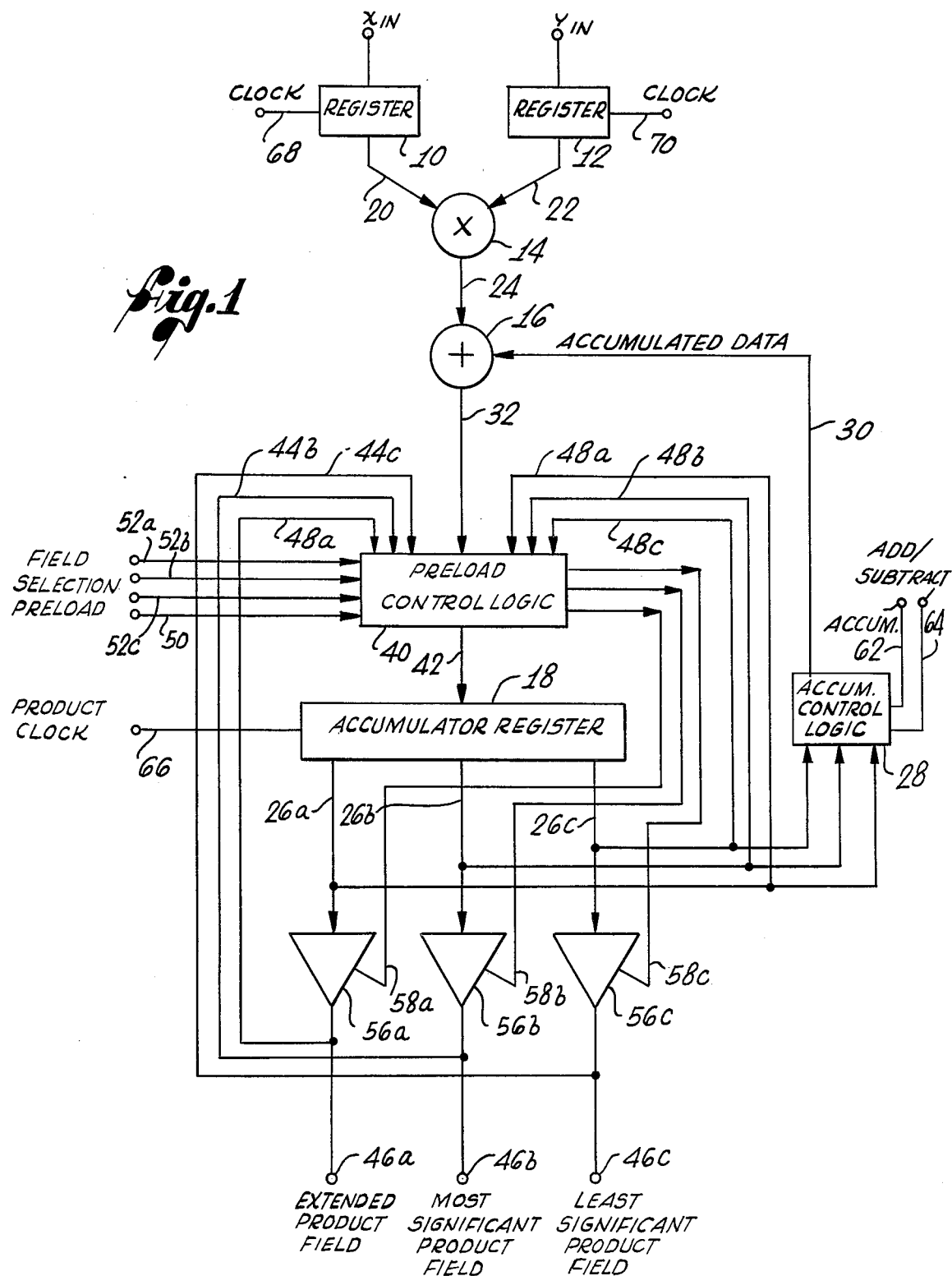
FIG. 1 is a simplified schematic diagram of the multiplier-accumulator circuit of the invention.

As shown in the drawings for purposes of illustration, the present invention is principally concerned with integrated multiplier-accumulator circuits. As shown in simplified form in FIG. 1, a multiplier-accumulator circuit includes two input registers, indicated by reference numerals 10 and 12, a multiplier circuit 14, a summing circuit 16, and an accumulator register 18. The input registers 10 and 12 receive two input quantities, a multiplier and a multiplicand, from terminals indicated as $X_{IN}$ and $Y_{IN}$, and these input quantities are transmitted to the multiplier 14 over lines 20 and 22 respectively. The output product from the multiplier 14 is then transmitted over line 24 to the summing circuit 16. The accumulator register 18 provides parallel outputs from three different fields of the register on lines 26a, 26b and 26c. The latter three lines are also connected to accumulator control logic 28, which controls transmission of the contents of the accumulator register 18 back to the summing circuit 16 over line 30. Output data from the summing circuit 16 is transmitted over lien 32, which, in a multiplier-accumulator circuit not utilizing the present invention, would be connected directly to the input terminals of the accumulator register 18. However, such a direct connection would afford no means for preloading the contents of the accumulator register 18 to a desired value, and any manipulations requiring such preloading would have to be performed inefficiently by external logic.

In accordance with the present invention, the multiplier-accumulator circuit includes preload control logic 40 connected to receive data on line 32 from the summing circuit 16, and to transmit selected data over line 42 to the accumulator register 18. The preload control logic 40 is also supplied with input data over lines 44a, 44b and 44c from input terminals 46a, 46b and 46c, which, in the presently preferred embodiment of the invention, also serve as output terminals for the accumulator register 18. In addition, the preload control logic 40 receives input data over lines 48a, 48b and 48c, which are, as shown, connected to the respective output lines 26a, 26b and 26c from the accumulator register 18. Under control of a preload signal supplied over line 50, and under further control of field selection signals supplied over lines 52a, 52b and 52c, the preload control logic 40 transmits to the accumulator register 18, over line 42, data derived either from the summing circuit 16, from the input terminals 46a, 46b and 46c, or from the accumulator register itself, over lines 48a, 48b and 48c.

Since the terminals 46a, 46b and 46c must serve both as input and output terminals, three-state buffers, indicated at 56a, 56b and 56c, are provided between the output lines 26a, 26b and 26c of the accumulator register 18 and the corresponding output terminals 46a, 46b and 46c. The outputs of the three-state buffers 56a, 56b and 56c have one of three possible states, depending upon the states of the inputs provided over lines 26a, 26b and 26c, and the states of the control signals applied to the buffers over lines 58a, 58b and 58c. If the voltage level applied to a particular one of the control lines 58 is high, the corresponding buffer 56 assumes a high-impedance state, effectively disconnecting the corresponding line 26 from the output terminal 46, so that input data may then be provided to the terminals 46 and transferred over lines 44 to the preload control logic 40. On the other hand, if the voltage level applied to one of the control lines 58 is low, the buffer 56 assumes a low-impedance state, and the output on the corresponding terminal 46 is determined by the level of the input to the buffer. In this manner, the terminals 46 serve both as input terminals and as output terminals. Signals on the control lines 58a, 58b and 58c are generated by the preload control logic 40 in response to the preload and field selection control signals provided over lines 50, 52a, 52b and 52c.

It will be appreciated that the data paths shown in FIG. 1 are multi-bit paths. The input registes 10 and 12 may be any desired size, such as eight, twelve, or twenty-four bits. For purposes of illustration in this application, an eight-bit multiplier-accumulator is illustrated and described in detail. The accumulator register 18 must be of sufficient length to accumulate the sum of a number of products from the multipler 14. Since the products supplied by the multiplier 14 over line 24 will have a word length twice as long as that of either of the input registers 10 and 12, the accumulator register 18 should have a word length somewhat greater than that of the input registers. As will be seen in the following detailed description of an eight-bit multiplier-accumulator, the accumulator register 18 illustrated herein is nineteen bits long, and is, for convenience, divided into a least significant field of eight bits, a most significant field of eight bits, and an extended field of three additional bits having even more significance than the "most" significant field. These three fields are indicated diagrammatically by the three separate output lines 26, as well as by the three buffers 56, the three input lines 44, and the three recirculating data lines 48. As will be appreciated, it is an important aspect of the invention that the fields of the accumulator register 18 may be preloaded selectively by the preload control logic 40.

The effect of the preload control signal on line 50 is such that, if the signal is in a particular state, such as a logical zero, this indicates to the preload control logic 40 that no input data is to be preloaded into the accumulator register 18. In that event, the preload control logic 40 passes data received over line 32 from the summing circuit 16 directly to the accumulator register 18, over line 42. However, if the preload control signal is in the opposite state, or a logical one, and at least one of the field selection signals on lines 52a, 52b and 52c is also in a particular logical state, then the preload control logic 40 functions to receive data from at least one input field, over at least one of the lines 44, and to transmit this input data to the accumulator register 18 over line 42. The preload control logic 40 also sets the lines 58 in a high state, so that the three-state buffers 56 assume a high-impedance state for the input of data from the terminals 46.

For those fields that are not selected by the field selection signals 52a, 52b and 52c, data from the accumulator register 18 is recirculated, over one or more of the lines 48a, 48b and 48c, to the preload control logic 40, and thence over line 42 back to the accumulator register 18. Thus, selected fields of the accumulator register may be preloaded with data provided on the input terminals 46a, 46b and 46c, while those fields of the accumulator register not selected for preloading will be left intact.

As will be explained in further detail, the accumulator control logic 28 utilizes two control signals, an accumulate signal on line 62 in an add/subtract signal on line 64. Depending upon the states of these two control signals, the accumulator control logic 28 transmits over line 30 to the summing circuit 16 either (1) the contents of the accumulator register 18, to be added to the current product data on line 24, (2) the complemented or negated contents of the accumulator register 18, to be subtracted from the product on line 24, or (3) essentially no data at all, so that the entire circuit then functions as a pure multiplier.

As will become apparent from the more detailed description that follows, data is clocked into the accumulator register 18 by means of a product clock signal on line 66. There are also two separate input clock signals provided on lines 68 and 70, for clocking the input data into the input registers 10 and 12, respectively.

Figure 2:
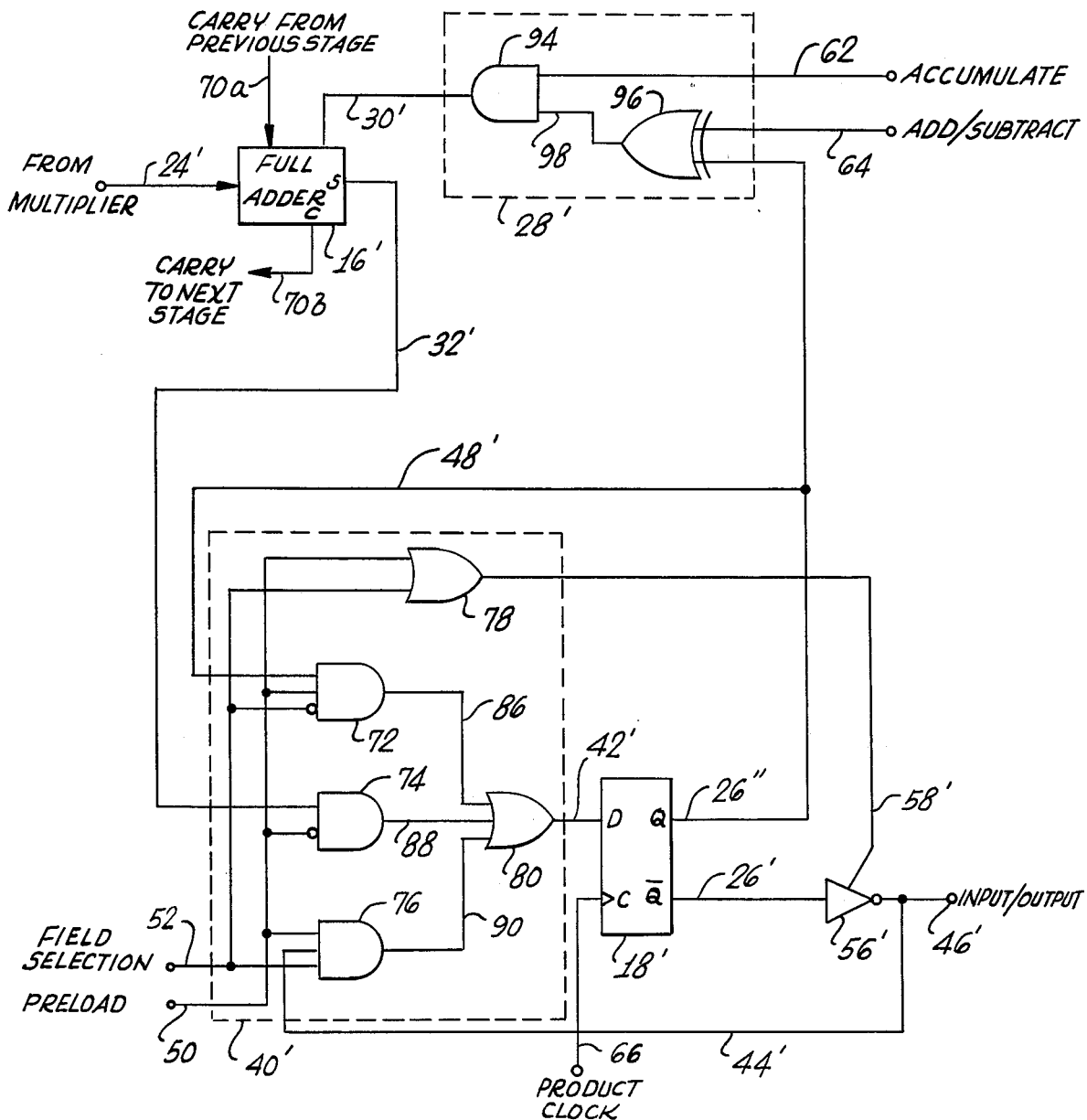
FIG. 2 is a fragmentary logic diagram of one stage of the multiplier-accumulator circuit of FIG. 1, showing preload control logic and accumulator logic for one stage.

FIG. 2 illustrates one binary stage of the preload logic 40 (FIG. 1) and accumulator control logic 28 (FIG. 1). The reference notation adopted is that, if a line or a portion of any logic is referred to by a reference numeral in FIG. 1, it is referred to by the same numeral in FIG. 2, but with the prime symbol (') added. Thus, the single-stage portion of the preload control logic 40 is referred to in FIG. 2 by the reference numeral 40', and the single-stage portion of the accumulator control logic 28 is referred to in FIG. 2 by 28'.

As shown in FIG. 2, the summing circuit 16 (FIG. 1) includes a plurality of full binary adders, one of which is indicated at 16'. Each full adder 16' receives one input signal over lin 24' from the multiplier circuit 14 (FIG. 1), and receives another input signal over line 30' from the accumulator control logic 28'. It also receives a carry signal from the previous stage, over line 70a, and outputs a sum signal on line 32' and a carry signal to the next stage on line 70b. Of course, as will be seen in relation to the complete logic diagram of FIG. 3, there is no carry signal out of the most significant stage, and no carry signal into the least significant stage, except to the extent that the carry signal input of the least significant stage is utilized in taking the two's complement of the contents of the accumulator register 18.

Each preload control logic stage 40' comprises three AND gates 72, 74 and 76, and two OR gates 78 and 80. The preload signal on line 50 is applied as one input to AND gate 72, as one input to AND gate 76, as an inverted input to AND gate 74, and as an input to OR gate 78. The field selection signal on line 52, which, as discussed in relation to FIG. 1, may be a field selection signal on line 52a, 52b, or 52c, depending on the position of the binary stage in relation to the accumulated product word, is applied as an inverted input to AND gate 72, as an input to AND gate 76, and as a second input to OR gate 78. The outputs of AND gates 72, 74 and 76 are connected as inputs to the OR gate 80 by lines 86, 88 and 90, respectively, and the output of OR gate 80 is applied over line 42' to the D input of a D-type flip-flop 18', which forms one binary stage of the accumulator register 18.

The inverted output ($\bar{Q}$) on line 26' from the flip-flop 18' is applied as an input to an inverting three-state buffer 56', the output of which is connected to one of the input/output terminals 46'. Connection is also made from the input/output terminal 46' back over line 44' to a third input of the AND gate 76. The non-inverted output (Q) of the flip-flop 18', indicated at 26", is transmitted to the accumulator control logic 28', and is also connected by line 48' as a third input to AND gate 72 in the preload control logic stage 40'.

The accumulator control logic 28' includes an AND gate 94 and an exclusive OR gate 96. The exclusive OR gate 96 has two inputs, one of which is the addd/subtract signal on line 64, and the other of which is derived from the Q output of the flip-flop 18' on line 26". The output of the exclusive OR gate 96 is connected by line 98 as an input to the AND gate 94, the other input of which is provided by the accumulate control signal on line 62. The output of the AND gate 94 is connected by line 30' to the full adder 16'.

In operation, the preload control logic stage 40' functions as follows. One binary digit of output from the multiplier 14, is applied over line 24', to the full adder 16', which add or substract information derived from the accumulator control logic 28'. Thereafter, output data from each stage of the summing circuit 16, i.e., from each adder 16', is transmitted over line 32' to the corresponding preload control logic state 40'. Basically, the preload control logic stage 40' has three sources of input data: (1) the data derived from the full adder 16' over line 32', (2) the data derived from the input/output terminal 46' over line 44', and (3) the data recirculated from the flip-flop 18' over lines 26" and 48'. The preload control logic stage 40' selects data from one of these three sources in accordance with the states of the preload control signal on line 50 and the field selection signals on its one of the lines 52, the selected data being clocked into the flip-flop 18' by the product clocking signal applied to line 66.

When the preload control signal on line 50 is a logical zero, no preloading occurs, and normal multiplier-accumulator functions are performed. It will be apparent that, if the preload control signal is a logical zero, AND gate 74 is enabled, but AND gates 72 and 76 are disabled. Thus, the data selected by the preload control logic stage 40' is that derived from the full adder 16' over line 32'. The selected data will be transmitted over line 88 to the OR gate 80, and thence over line 42' to the flip-flop 18'. Since the preload signal on line 50 is also applied as an input to OR gate 78, and thence to the control terminal of the buffer 56', it will also be apparent that, provided the field selection signal on line 52 is also a logical zero, the buffer will assume a low-impedence condition, allowing the terminal 46' to function as an output terminal. Accordingly, the data input to the flip-flop 18' will also be available at the terminal 46' for output purposes.

When the preload signal on line 50 is in this zero state, and the field selection signal on line 52 is a logical one, the buffer 56' will assume a high-impedance state, blocking output from the accumulator register 18', while inputs are simultaneously blocked by AND gate 76. In this manner, the field selection signal can be used for normal data routing functions in a busing arrangement. When the field selection signal is a logical one, output data can be placed on a data bus for routing to other circuits. When the field selection signal is a logical zero, output of data to the bus is inhibited, and input can be enabled by means of the preload control signal.

When the preload signal on line 50 is a logical one, and the field selection signal on line 52 is also a logical one, this particular stage is one selected for preloading. In this condition, AND gates 72 and 74 will be disabled, but AND gate 76 will be enabled. Moreover, the logical one condition of the preload signal on line 50 will be transmitted through OR gate 78 to the control terminal of the buffer 56', thereby placing it in a high-impedance condition so that the terminal 46' may be used as an input terminal. Accordingly, input data impressed on the terminal 46' will be transmitted over line 44' to the enabled AND gate 76, and thence by line 90, OR gate 80, and line 42' to the D terminal of the flip-flop 18'. In this manner, data applied to the input/output terminal 46' is preloaded into the flip-flop 18', which comprises one stage of the accumulator register 18 (FIG. 1).

As previously mentioned, the entire accumulator register 18 (FIG. 1) need not be preloaded with input data, but selected fields of it may be preloaded. In such instances, it is necessary to preserve the contents of the those portions of the accumulator register 18 that are not to be preloaded. This could be done in a somewhat inconvenient fashion by providing separate clock signals for the separate fields of the accumulator register 18. However, the circuit of the present invention accomplishes the same result by utilizing only the single product clock signal on line 66. If the preload signal on line 50 is in a logical one state and the field selection signal on line 52 is in a logical zero state, it will be apparent that AND gates 74 and 76 will be disabled, and AND gate 72 will be enabled. Data will than be recirculated from the Q output of the flip-flop 18', over lines 26" and 48', through AND gate 72, and thence by line 86, OR gate 80, and line 42' to the D terminal of the flip-flop 18'. Thus, when a selected field of the accumulator register 18 (FIG. 1) is to be preloaded with data by appropriate manipulation of the preload signal on line 50 and field selection signals on line 52, the field of the accumulator register not selected for preloading will be kept intact by recirculating their contents through the preload control logic 40'.

Operation of the accumulator control logic 28' should be readily apparent from the detailed logic shown in FIG. 2. In particular, if the accumulate signal on line 62 is a logical zero, AND gate 94 will be disabled, and the output signal on line 30' will be a logical zero, regardless of the state of any input data on line 26" from the flip-flop 18'. However, if the accumulate signal on line 62 is a logical one, the AND gate 94 will be effectively enabled, and the output on line 30' will be determined in part by the state of the add/subtract signal on line 64. If the add/subtract signal on line 64 is a logical zero, the output of the exclusive OR gate 96 on line 98 will follow the state of the input derived from the flip-flop 18'. Thus, the Q output of the flip-flop 18' will appear on line 30' and will be applied as one input to the full adder 16'. The contents of the accumulator register 18 (FIG. 1) will then be effectively added to the product supplied from the multiplier 14 (FIG. 1) over line 24.

If, on the other hand, the add/subtract control signal on line 64 is a logical one, the exclusive OR gate 96 functions essentially as a logical inverter, and the inverse of each bit of the accumulator register 18 (FIG. 1) will be supplied to the full adders 16'. As will be seen in relation to the complete logic diagram of the multiplier-accumulator of the invention, shown in FIG. 3, this will result in subtraction of the contents of the accumulator register 18 from the current product quantity supplied from the multiplier 14 (FIG. 1).

Figure 3:
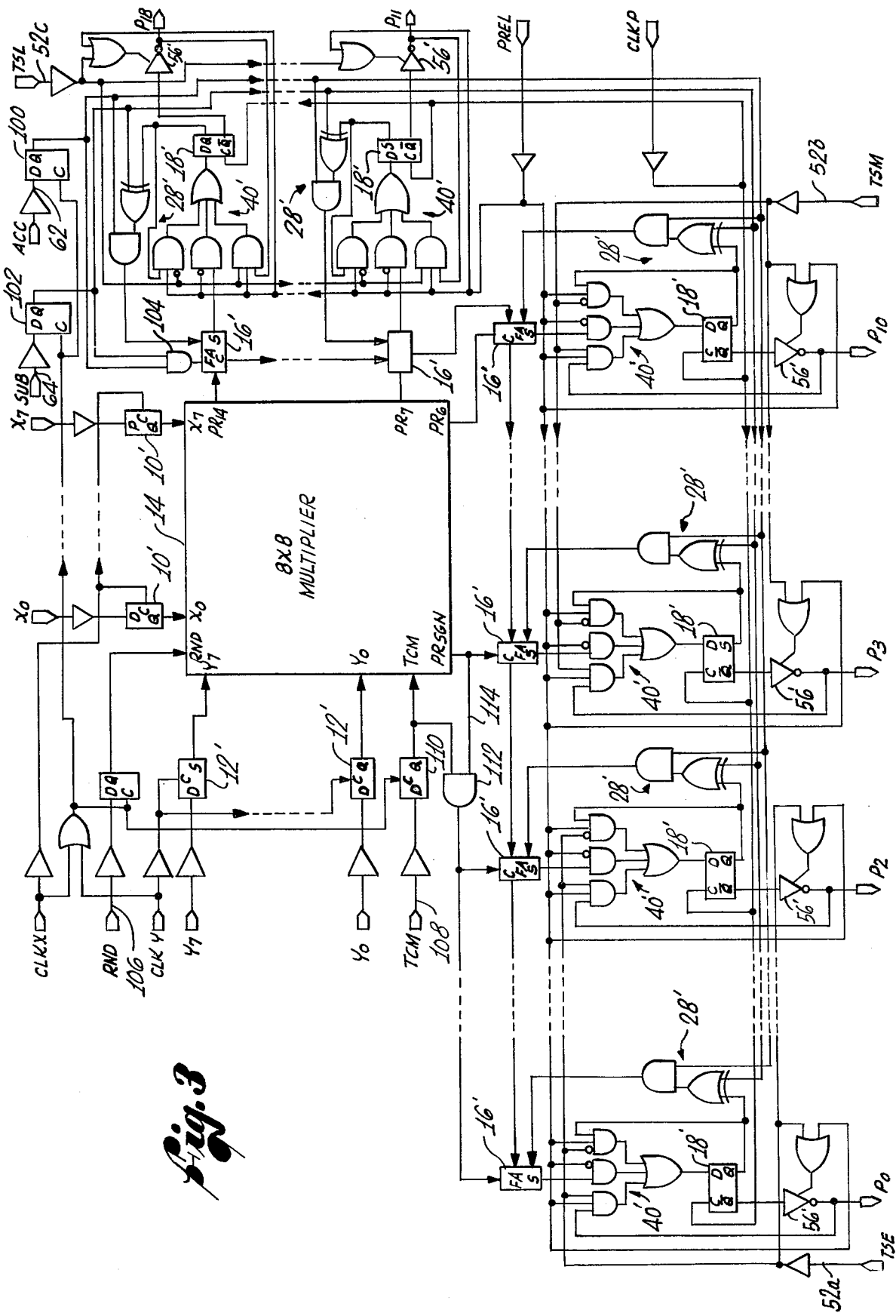
FIG. 3 is a detailed logic diagram of a complete eight-bit multiplier-accumulator embodying the present invention, with repeated portions of logic omitted for simplicity.

FIG. 3 shows, by way of example, a multiplier-accumulator utilizing the aforedescribed principles, and having eight-bit inputs and a nineteen-bit accumulator register. The input registers include eight flip-flops 10', of which only two are shown for clarity, and eight flip-flops 12', also of which only two are shown for clarity. The outputs of the flip-flops 10' and 12' are applied to the input terminals of the multiplier 14, which is shown in detail in FIG. 4. The product output fields are indicated in the multiplier block 14 as $PR_{SGN}$ through $PR_6$ and $PR_7$ through $PR_{14}$. The segmentation of the accumulator register 18 (FIG. 1) that was adopted in this instance was to consider the least significant product field as $PR_7$ through $PR_{14}$, and the most significant product field as $PR_{SGN}$ through $PR_6$. The extended product field comprises three bits of additional significance, indicated by the flip-flops having no inputs derived directly from the multiplier 14.

It will be apparent from FIG. 3 that the field control signal labeled TSL, corresponding to the control signal on line 52c in FIG. 1, is applied to the preload control logic stages 40' corresponding to the eight least significant bits of the product, i.e. the bits derived from outputs $PR_7$–$PR_{14}$ of the multiplier 14. The control signal labeled TSM corresponds to the field selection signal on line 52b in FIG. 1, and is applied to the eight most significant stages, i.e. those derived from the multiplier outputs indicated as $PR_{SGN}$-$PR_6$. Similarly, the field selection signal labeled TSE corresponds to the signal on line 52a in FIG. 1, and is applied to the three extended bits or stages of the accumulator register 18.

In the illustrative circuit, the accumulate signal on line 62 and the add/subtract signal on line 64 are clocked into flip-flops 100 and 102, respectively. The Q outputs of flip-flops 100 and 102 are then bused to all of the stages 28' of the accumulator control logic 28. The Q outputs of the flip-flops 100 and 102 are also ANDed together in an AND gate 104, the output of which is applied to the carry input of the full adder 16' at the least significant stage. Thus, if both the accumulate and add/subtract signals are logical ones, indicating that subtractive accumulation is to be performed, a one is added to the least significant bit position in order to perform a conventional subtraction fraction by taking the two's complement of the contents of the accumulator register 18. As is well known, the negative or two's complement of a binary number can be arrived at by first taking the one's complement, i.e., inverting each bit, as is done in the accumulator control logic, and adding one in the least significant bit position.

The multiplier-accumulator illustrated in FIG. 3 also includes a round input, indicated at 106, to provide conventional rounding of the multiplier product, and includes a two's-complement-mode input, indicated at 108. The two's-complement-mode input is clocked into a flip-flop 110, the output of which is used to enable an AND gate 112, as well as to supply a two's-complement-mode indication to the multiplier 14. When the AND gate 112 is enabled by selection of the two's complement mode, the sign output of the multiplier 14 is applied by line 114 as an input to the AND gate 112, and thence as inputs to the three full adders 16' which are included in the three extended-length stages of the accumulator register 18 (FIG. 1). Thus, in two's complement mode, the sign of the product is extended to a full nineteen bits, so that the quantity in the accumulator register may be consistently added to or subtracted from the product.

Figure 4:
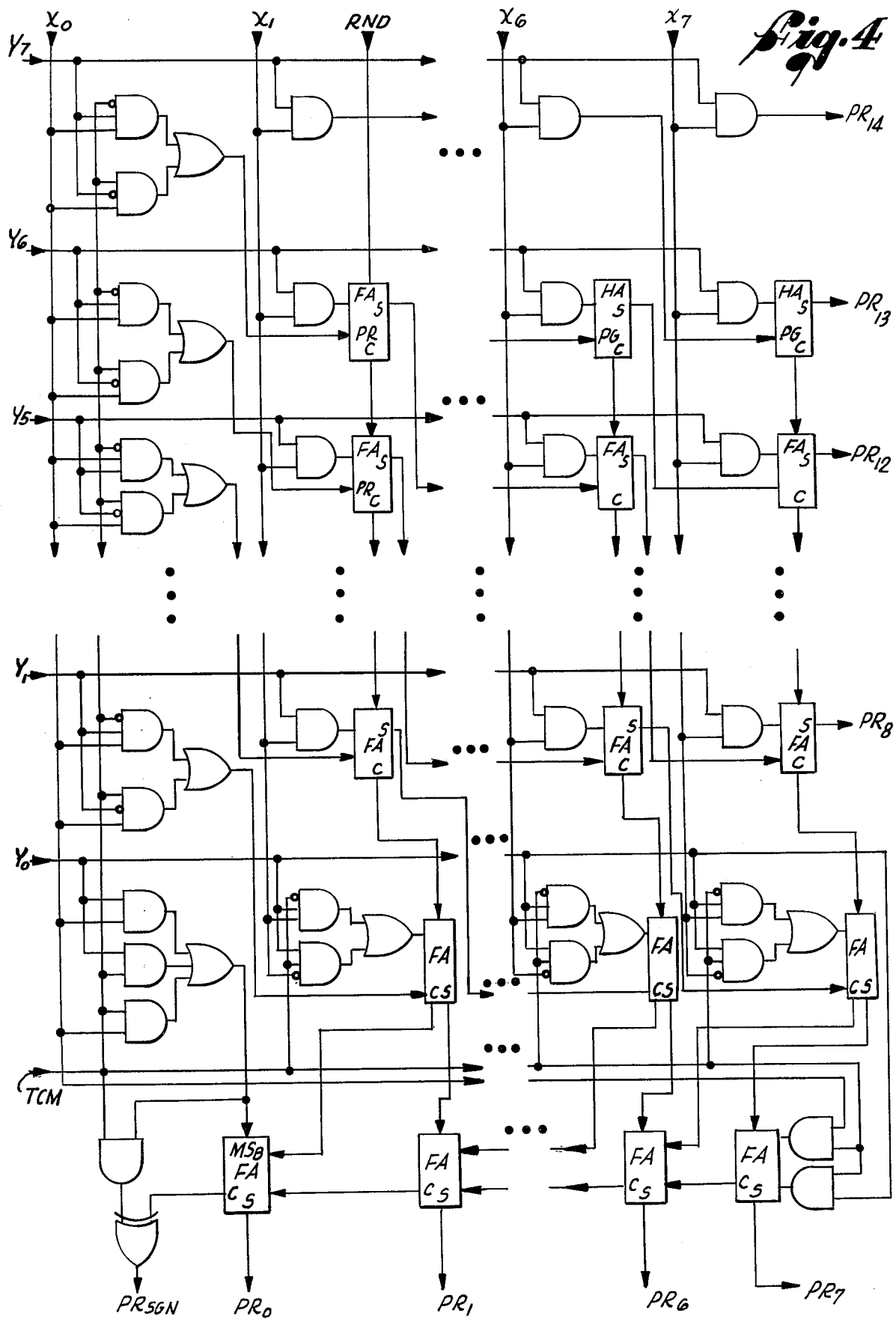
FIG. 4 is a detailed logic diagram of an eight-bit multiplier array utilized in the multiplier-accumulator of FIG. 3.

The specific form of the multiplier 14 is not critical to the present invention. However, for purposes of illustration, the detailed logic of an eight-by-eight binary multiplier is given in FIG. 4. The multiplier shown in FIG. 4 is conventional in nature, including a number of full adders, indicated by the designation FA, half adders, indicated by the designation HA, and other conventional logic gates.

It will be appreciated from the foregoing that the present invention represents a significant advance in the field of digital multipliers. In particular, the invention provides a multiplier-accumulator with the capability of selectively preloading digital quantities in its accumulator register without affecting the fields of the register not selected for preloading. It will also be appreciated that various modifications may be made without departing from the spirit and the scope of the invention. Accordingly, the invention is not to be limited except as by the appended claims.

I claim:

1. An integrated digital multiplier-accumulator circuit comprising:
    a digital multiplier circuit;
    a digital summing circuit having first and second input circuits, said first input circuit being connected to receive data from said multiplier circuit;
    an accumulator register having input terminals and output terminals;
    accumulator control means, responsive to accumulation control signals, for selectively transmitting data from said output terminals of said accumulator register back to said second input circuit of said summing circuit;
    a set of data terminals having the dual purpose of data output from said accumulator register and data input to said accumulator register;
    buffer means coupled to said output terminals of said accumulator register and to said set of data terminals, said buffer means being switchable to a high-impedance state to isolate said accumulator register from said data terminals; and
    preload control means having one output circuit connected to said input terminals of said accumulator register, and three input circuits connected, respectively, to said output terminals of said accumulator register, to said summing circuit, and to said set of data terminals, said preload control means being controllable to select input data from a selected one of its three input circuits.

2. An integrated digital multiplier-accumulator circuit as set forth in claim 1, wherein:
    said preload control means is responsive to a first state of a preload control signal to select input data from said summing circuit;
    said preload control means is responsive to a second state of said preload control signal and to a first state of a field selection signal, to select input data from said data terminals and to switch said buffer means to the high-impedance state;
    said preload control means is responsive to the second state of said preload control signal and to a second state of said field selection signal, to select input data from said output terminals of said said accumulator register and to switch said buffer means out of the high-impendance state; and
    a field selection signal of said first state is applied to selected fields of said preload control means, to preload input data into corresponding selected fields of said accumulator register, while leaving unselected fields of said accumulator register intact.

3. An integrated digital multiplier-accumulator circuit as set forth in claims 1 or 2, wherein said accumulator control means includes:
    first gating means, for selectively gating data from said output terminals of said accumulator register to said second input circuit of said summing circuit; and
    second gating means, for selectively inverting data from said output terminals, to provide for its subtraction in said summing circuit.

4. An integrated digital multiplier-accumulator circuit as set forth in claim 1, wherein said preload control means includes:
    first gating means operable to select input data from said summing circuit;
    second gating means operable to select input data from said set of data terminals;
    third gating means operable to select input data from said accumulator register;
    fourth gating means, for transmitting data selected by one of said first, second and third gating means to said accumulator register input terminals; and
    fifth gating means for switching said buffer means to its high-impedance state when said second switching means is enabled to select input data from said set of data terminals, or when a field selection signal is in a particular state.

5. An integrated digital multiplier-accumulator circuit as set forth in claim 1, wherein:
    control of said preload control means is effected by the combined states of a preload control signal and at least one field selection signal;
    said preload control signal has a first state to provide selection of input data from said summing circuit and a second state to provide selection of input data from selected fields of said set of data terminals; and
    said preload control means includes means responsive to said field selection signal, to control the impedance state of said buffer means when said preload control signal is in its first state, and means also responsive to said field selection signal, to control which fields are selected for preloading of data from said data terminals when said preload control signal is in its second state.

6. An integrated digital multiplier-accumulator circuit as set forth in claim 1, wherein said preload control means includes:
    means responsive to a first state of a preload control signal to effect selection of input data from said summing circuit;
    means responsive to a second state of the preload control signal, to effect selection of input data from said set of data terminals; and
    means responsive to a field selection signal, for selecting fields of said accumulator register to be preloaded with input data when the preload control signal is in the second state, and for selecting fields of said accumulator register to be isolated from said set of data terminals when the preload control signal is in the first state.

7. An integrated digital multiplier-accumulator circuit comprising:
   a digital multiplier circuit;
   an accumulator register having input terminals and output terminals;
   a set of data terminals for the application of externally supplied input data to said accumulator register;
   a summing circuit connected to receive input signals from said multiplier circuit and from said accumulator register and to provide an output signal indicative of the sum of the input signals; and
   preload control means, including means for selecting between data derived from said summing circuit and data supplied through said data terminals, and transmitting such selected data to said accumulator register, said preload control means being connected to receive inputs from said data terminals and from said summing circuit output signal, and to provide outputs to said accumulator register;
   and wherein said preload control means effects preloading of said accumulator register with selected data when said preload control means selects data supplied through said data terminals, and effects accumulation of data from said multiplier circuit in said accumulator register, when said preload control means selects data derived from said summing circuit.

8. An integrated digital multiplier-accumulator circuit as set forth in claim 7, wherein:
   said data terminals also serve as output terminals for said accumulator register; and
   said multiplier-accumulator circuit further includes buffer means coupling said output terminals of said accumulator register to said data terminals, said buffer means being switchable to a high-impedance state to allow input of data from said data terminals, and to a low-impedance state to allow said data terminals to serve as output terminals.

9. An integrated digital multiplier-accumulator circuit as set forth in claims 7 or 8, wherein:
   said preload control means further includes means for selecting data from said output terminals of said accumulator register for input to said accumulator register;
   said preload control means is responsive to the state of a preload control signal and the state of a field selection signal, for selecting accumulator register input data from said summing circuit, said data terminals, and said accumulator register;
   said preload control means has a plurality of separate stages corresponding to digital stages of said accumulator register;
   and wherein said field selection signal is applied to selected stages of said preload control means, to enable preloading of data into only selected fields of said accumulator register, unselected fields of said register remaining intact by recirculation of data through said preload control means.

* * * * *